United States Patent Office 3,183,137
Patented May 11, 1965

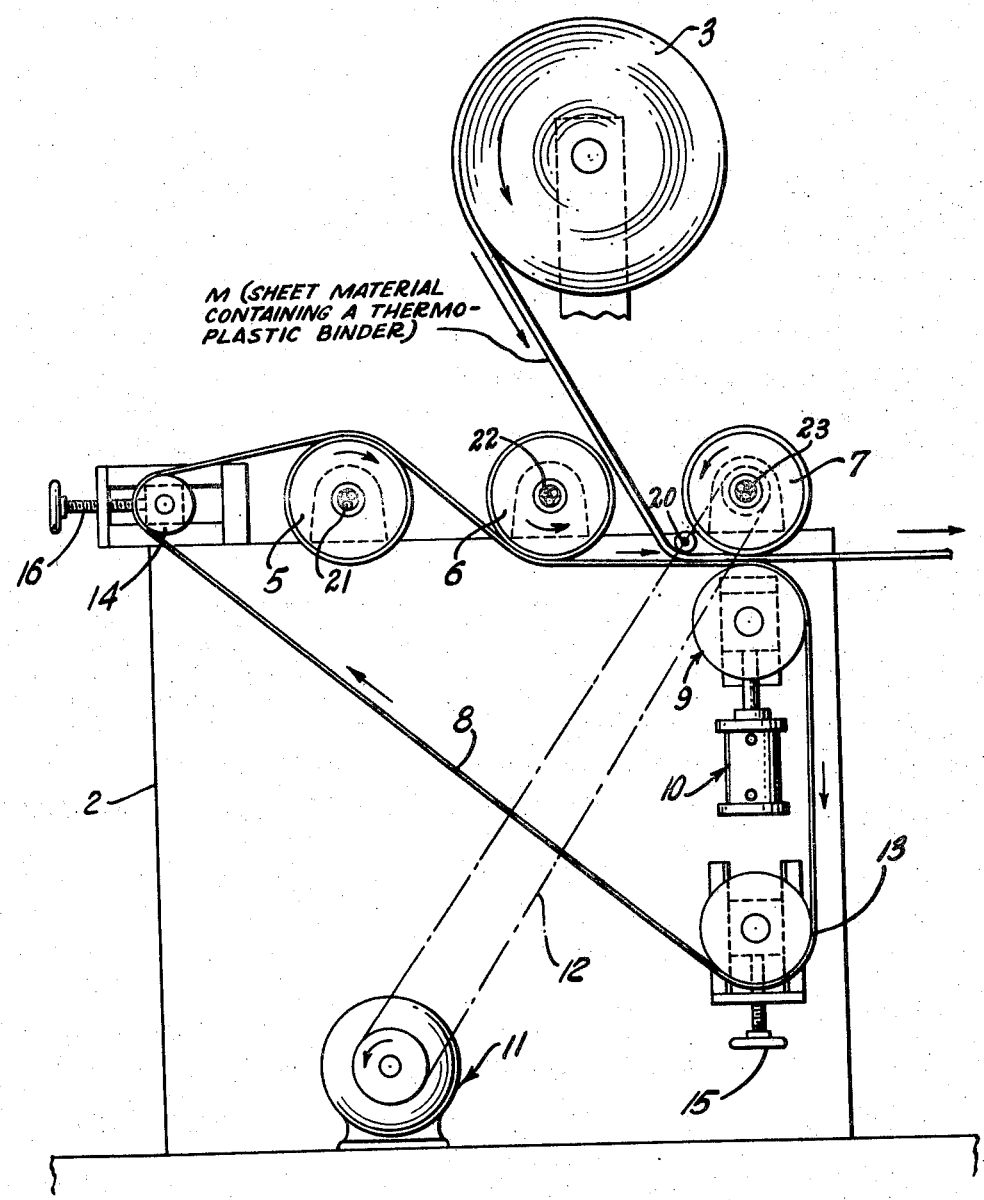

3,183,137
METHODS AND APPARATUS FOR TREATING SHEET MATERIALS
Carlyle Harmon, Scotch Plains, and Hector W. Griswold, Princeton, N.J., assignors, by mesne assignments, to Johnson & Johnson, New Brunswick, N.J., a corporation of New Jersey
Filed Dec. 5, 1960, Ser. No. 73,723
4 Claims. (Cl. 156—309)

This invention relates to the bonding of sheet materials with a thermoplastic binder. Moreover, this invention is concerned with the production of a textile fabric directly from fibers without the use of conventional spinning, weaving, knitting or felting operations. In particular, this invention is concerned with method and apparatus for bonding a relatively loosely assembled fibrous web with a thermoplastic binder by the application of heat and pressure to effect the bonding thereof.

Generally, when a thermoplastic binder is utilized to bond sheet materials, the thermoplastic binder is heated to its softening or fusing temperature, or to a slightly higher temperature, and then pressure is applied to cause the thermoplastic binder to flow and adhere to the material being bonded. Conventionally, this is done by using a pair of heated pressure rollers and by passing the material to be bonded containing the thermoplastic binder between the rollers to simultaneously heat and apply pressure to the thermoplastic binder to effect the bond.

The strength of the bonded sheet material will depend to a large degree on the temperature to which the thermoplastic binder is raised and also on the pressure applied to the thermoplastic binder. Generally, the higher the temperature and pressure, the greater the strength of the bonded sheet material. The upper limit of the temperature will depend on the thermoplastic binder used and on the sheet material used, inasmuch as too high a temperature may degrade or discolor either the thermoplastic binder or the sheet material. If the pressure is increased too much, the sheet material will be greatly compressed and the thermoplastic binder forced over a large area of the surface of the sheet material. This will produce a stiff and papery final product unsuitable for many end uses such as apparel or clothing, sanitary products, surgical products, and the like.

In bonding sheet materials, it is desirable to attain a uniform bond throughout the entire sheet as the strength of the final product will normally be the strength of the weakest bond. In order to attain such uniformity in bonding, it is desirable that the temperature be substantially constant over the entire sheet and the pressure applied to effect the bond substantially uniform over the entire sheet.

When using the conventional method of a pair of heated pressure rolls to bond sheet materials with a thermoplastic binder, the heat and pressure are simultaneously and almost instantaneously applied. With this prior method, temperatures and pressures approaching the upper limits, previously described, are necessary in order that sufficient softening of the thermoplastic binder takes place throughout the sheet material to effect a strong uniform bond.

It is an object of the present invention to provide a method for bonding sheet materials with a thermoplastic binder without discoloring or degrading the sheet material and/or the thermoplastic binder.

It is another object of the present invention to produce a thermoplastic bonded sheet material which is soft and durable and hence is suitable for end uses in the apparel, sanitary or surgical fields.

It is a further object of the present invention to provide apparatus for bonding sheet materials with a thermoplastic binder.

In accordance with the invention, sheet material is bonded with a thermoplastic binder by placing the sheet material containing the thermoplastic binder on a heated movable surface, such as a heated endless flexible belt and passing said heated movable surface, while in the heated state and with the sheet material thereon, substantially tangentially to a heated rotatable surface, for example, a heated rotatable roll, and applying pressure to the sheet material containing the thermoplastic binder while it is positioned between said heated movable surface and said heated rotatable surface.

In the drawing, there is shown a frame 2 which is provided for mounting the apparatus of the invention. Above the frame 2, there is provided a rotatable supply roll 3 for supplying sheet material M, which contains the thermoplastic binder, to the apparatus of the invention. Below the supply roll 3 but at the top of the frame, there are two rotatable rolls 5 and 6. These rolls 5 and 6 are heated by heaters 21 and 22 connected to suitable heating sources such as steam, electricity, etc., through conventional rotary couplings in the ends of rolls 5 and 6, though, for clarity, the particular heating source is not shown. The rolls 5 and 6 are provided to supply a portion of the heat necessary to effect bonding. This is done by allowing rolls 5 and 6 to contact an endless flexible belt 8. The endless flexible belt 8 runs horizontally at the top of the frame, passing over roll 5 and under roll 6. In line horizontally with rolls 5 and 6 is a third rotatable pressure-applying roll 7. Roll 7 is also heated by heater 23 connected to a suitable heating source through conventional rotary couplings in the ends of roll 7 though for the sake of clarity, said heating source is not shown. Positioned in front of roll 7 is rotatable roll 20 for guiding the sheet material M onto the heated flexible belt 8 prior to said material contacting the heated roll 7. Directly beneath pressure-applying roll 7 is a rotatable backing roll 9 forming a nip with roll 7 through which the endless flexible belt 8 passes. Pressure is controllably applied by backing roll 9 to the endless flexible belt 8 and roll 7 by means of a pressure cylinder 10. The endless flexible belt 8 passes around backing roll 9 and then vertically down towards the bottom of the frame 2 where it passes around rotatable guiding roll 13 and then diagonally up to the top of the frame to rotatable guiding roll 14 where it again starts its horizontal travel. Rolls 13 and 14 are provided with screw adjustments 15 and 16 for adjusting their relative position and for controlling the tension on the endless flexible belt 8.

At the bottom of frame 2, there is provided a motor 11 which drives rotatable roll 7 by means of a flexible driving belt 12. The driven roll 7 in turn drives, through friction, the endless flexible belt 8 and backing roll 9 and also acts, through friction, as the feeding means for the sheet material M. It is readily seeen that pressure roll 7, backing roll 9, endless flexible belt 8 and sheet material M may either be separately driven or any combination driven which would produce the result of having them all move in the same direction at approximately the same surface speed.

In the operation of the apparatus, the endless flexible belt 8 is brought into contact with heated roll 5 and heated roll 6 whereby the endless flexible belt 8 is heated to approximately the temperature of the heated rolls. While the endless flexible belt is in the heated state, the sheet material M containing the thermoplastic binder is placed on the endless flexible belt. The laminated structure comprising the endless flexible belt and sheet material, while still in the heated state, is then passed through the nip formed by the heated roll 7 and roll 9 whereby the sheet material is further heated and pressure is applied to the sheet material and endless flexible belt. The combination of heat and pressure soften the thermoplastic binder and cause it to adhere to the sheet material to form a thermoplastic bonded sheet material.

The heated rolls 5 and 6 may be made of any suitable material such as steel, copper or other metals, or, if desired, a coated roll may be used; e.g. a metal core coated with silicone; "Teflon," a polytetrafluorocarbon plastic produced by E. I. du Pont de Nemours; or similar substances. The material chosen will depend largely on the temperature to which the rolls are to be subjected. The rolls are provided with a smooth surface to more efficiently transfer heat to the endless flexible belt 8. If desired, more rolls or other heating means, such as infrared lamps, may be used to increase the amount of heat applied to the endless flexible belt.

The belt 8 is flexible to withstand the configuration it is subjected to in the apparatus and may be made of nylon, silicone-coated rubber, "Teflon"-coated Fiberglas or similar materials.

The heated roll 7 may be made of the materials previously described for the heated roll 5 and 6.

Roll 9 may be made of materials similar to those used for the heated rolls; but since no direct heat is applied to this roll, choice of material is not as critical.

The invention will be hereinafter more fully described by reference to its preferred embodiment; i.e., the production of a nonwoven fabric by bonding together, with a thermoplastic binder, the individual fibers of a fibrous web. This description is not to be considered as limiting but is solely given to more clearly and fully describe the present invention.

Generally, the individual fibers are in the form of a layer or web of overlapping and intersecting, loosely associated fibers.

The layer of overlapping and intersecting, loosely associated fibers may be formed by any one of a number of conventional techniques for depositing, arranging or rearranging fibers in a web. These techniques include carding, garnetting, air-laying, papermaking methods, and the like. Individual webs or thin layers formed by one or more of these techniques may be laminated to provide a thicker layer for conversion into a fabric. Typical methods and apparatus for arranging or rearranging such fibrous webs are more particularly described in U.S. Patents 2,676,363 and 2,862,251.

Fibers of almost any material may be used in making the fibrous web previously described. Fibers possessing particular qualities may be employed to contribute the same or related properties to the resulting fabric. For instance, relatively absorbent fibers are preferred when a fabric possessing high absorbency is desired. Natural fibers, such as cotton; artificial fibers, such as regenerated cellulose; or synthetic fibers, such as nylon or the like, may be employed.

The thermoplastic binder is then applied to the already formed fibrous layer. The method of applying the thermoplastic binder is not critical and any well-known process of uniform distribution may be employed; e.g., if thermoplastic particles are used, they may be sifted through screens having openings of a desired size, usually slightly larger than the largest particle present. Although particles are mentioned, other shapes may also be used, such as rods, spheres, fibers, etc.

Suitable thermoplastic binders are the polyolefins, such as polyethylene and polypropylene; the vinyls such as polyvyl chloride and polyvinylidene chloride; the polyamides such as nylon 6 and nylon 11; the cellulosics such as cellulose acetate and ethyl cellulose; the styrene polymers such as polystyrene and polymethylstyrene; the acrylics such as ethyl acrylate and methyl acrylate; etc.

The over-all amount or percentage of thermoplastic binder distributed through the fibrous web is an important factor affecting the final nonwoven fabric characteristics. Insufficient binder produces a weak nonwoven fabric; whereas, excessive binder produces a stiff and harsh nonwoven fabric. The most practical range of thermoplastic binder content for a nonwoven fabric appears to be from about 5% to about 40% of the weight of the nonwoven fabric.

The fibrous web containing the thermplastic binder is then fed to the apparatus previously described in order to apply heat and pressure to the thermoplastic binder to effect the bond and produce a nonwoven fabric.

For a given thermoplastic binder, there is an optimum temperature range and an optimum pressure range within which the thermoplastic binder softens and flows. If the temperature and pressure are too low, the binder merely becomes tacky and does not adhere to the individual fibers of the fibrous web. If the temperature and pressure are too high, the thermoplastic binder liquifies, thus spreading over the surface of the fibrous web and producing a stiff nonwoven fabric. Satisfactory results have been obtained using temperatures in the range of from about 225° F. to about 500° F. and pressures in the range of from about 10 lb./sq. in. to about 60 lb./sq. in.

In order to more clearly disclose the manner in which the invention may be carried into practice, several specific embodiments will hereinafter be described in detail. It should be understood, however, that this is done purely by way of example and not for the purpose of delineating the breadth of the invention or limiting the ambit of the appended claims.

*Example I*

Rayon fibers, ⅜ inch in length, 1½ denier, are slurried in water with approximately 10% by weight of nylon 6 rods, ⅟₁₆ inch in length, 15 denier. A web is formed by papermaking techniques using this mixture. The web is dried and then lightly prebonded with polyvinyl alcohol to aid in further processing. The resultant web weighs about 460 grains per square yard.

A "Teflon"-coated Fiberglas belt is heated to approximately 445° F. by contacting one side of the belt with an electrically heated roll and then contacting the other side of the belt with a second electrically heated roll.

The fibrous web as previously described is then fed to and placed on the surface of the belt, while the belt is at a temperature of approximately 455° F., and the fibrous web and belt, while still hot, presented to the nip formed by an electrically heated "Teflon"-coated steel roll and a hard rubber rotatable roll. The surface of the heated roll is at a temperature of approximately 470° F. The outer surface of the sheet material contacts the heated roll and the outer surface of the belt contacts the hard rubber roll. By means of air cylinders, the hard rubber roll is pressed against the heated roll to produce a pressure at the line of contact between the heated roll and the sheet material of approximately 120 pounds per lineal inch.

The heated roll is driven by means of a motor and pulley and the roll in turn drives, through friction, the belt and hard rubber roll. All three items move at the same linear speed to produce a nonwoven fabric at approximately 39 feet per minute.

The resulting bonded nonwoven fabric is soft and durable and is not discolored in any way.

*Example II*

An 800-grain per square yard nonwoven fabric made from rayon and nylon fibers over-all impregnated with an acrylic resin binder is placed on a heated "Teflon"-coated Fiberglas belt. The temperature of the belt is approximately 250° F. On top of the nonwoven fabric is placed a polyextruded film of ½-mil thick polyester and 2-mil thick polyethylene sold by the Standard Packaging Corporation under the tradename Flexer 5. The film is placed so that the polyethylene side contacts the nonwoven fabric.

The three layers—belt, nonwoven fabric and film— while hot; i.e., approximately 250° F., are then passed to the nip formed by a "Teflon"-coated steel roll having a surface temperature of 300° F., and a hard rubber roll. The "Teflon"-coated roll contacts the film and the hard rubber roll contacts the belt. A pressure of 100 pounds per lineal inch is applied at the line of contact between the heated roll, film, nonwoven fabric, belt and hard rubber roll.

The resulting bonded nonwoven fabric is soft and durable and is not discolored in any way.

The "Teflon"-coated roll is driven by means of a motor and pulley and in turn drives, by friction, the belt and hard rubber roll to produce a polyethylene bonded laminate of a polyester film and a nonwoven fabric at a speed of approximately 22 feet per minute.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. A method of bonding sheet material with a thermoplastic binder which comprises:
   feeding sheet material containing a thermoplastic binder to a heated surface;
   conveying said heated surface with the sheet material thereon a spaced distance whereby said sheet material is heated;
   passing the exposed surface of said sheet material substantially tangential to a heated rotatable surface to contact said sheet material with said rotatable surface substantially only at a line of tangency between the plane of the sheet material and the surface of said rotatable surface; and
   applying pressure to said sheet material at said line of tangency whereby said thermoplastic binder is softened and adheres to said sheet material.

2. Apparatus for bonding which comprises:
   a heated rotatable roll;
   a heated endless flexible belt passing, while in the heated state, substantially tangential to said heated rotatable roll and contacting said heated rotatable roll substantially only at the line of tangency between the plane of the belt and the surface of the roll;
   means for placing material to be bonded on said heated endless flexible belt while said belt is in a heated state and at a spaced distance anterior to said belt passing substantially tangential to said heated rotatable roll; and
   means for applying pressure to said heated endless flexible belt at said line of tangency between the belt and the heated rotatable roll whereby a heated pressure bonding zone is formed between said belt and said heated rotatable roll.

3. Apparatus for bonding which comprises:
   a heated rotatable roll;
   an endless flexible belt passing substantially tangential to said heated rotatable roll and contacting said heated rotatable roll substantially only at the line of tangency between the plane of the belt and the surface of the roll;
   a pair of heated rolls anterior of said heated rotatable roll and contacting opposite surfaces of said flexible belt whereby said belt is heated;
   means for placing material to be bonded on said flexible belt after said belt has been heated and at a spaced distance anterior to said belt passing substantially tangential to said heated rotatable roll; and
   means for applying pressure to said heated endless flexible belt at said line of tangency between the belt and the heated rotatable roll whereby a heated pressure bonding zone is formed between said belt and said heated rotatable roll.

4. Apparatus for bonding which comprises:
   a pair of heated rolls;
   an endless flexible belt contacting a portion of the surface of each of said heated rolls whereby said belt is heated;
   a pair of pressure applying rolls between which the endles flexible belt pases while said belt is in the heated state, said belt contacting said pressure-applying rolls substantially only at a common line of tangency between the plane of the belt and the surfaces of the pressure-applying rolls;
   means for placing material to be bonded on said flexible belt after said belt has been heated and at a spaced distance anterior to said belt passing between said pressure applying rolls; and
   means for heating the pressure-applying rolls that contacts the material to be bonded whereby a heated pressure bonding zone is formed between said belt and said heated pressure applying roll.

References Cited by the Examiner

UNITED STATES PATENTS

| 1,519,239 | 12/24 | Clay | 154—1 |
| 2,562,641 | 7/51 | Saunders | 156—322 |
| 2,788,838 | 4/57 | Crabbe et al. | 154—3 |
| 2,890,147 | 6/59 | Person et al. | 156—283 |

FOREIGN PATENTS

| 303,898 | 4/30 | Great Britain. |

EARL M. BERGERT, *Primary Examiner.*